(12) United States Patent
Dobbs

(10) Patent No.: US 8,441,694 B2
(45) Date of Patent: May 14, 2013

(54) METHOD AND AN APPARATUS FOR ADJUSTING A SCANNING TARGET AREA OF AN IMAGE REPRODUCTION DEVICE

(75) Inventor: Michael David Dobbs, Battle Ground, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3095 days.

(21) Appl. No.: 10/676,488

(22) Filed: Sep. 30, 2003

(65) Prior Publication Data

US 2005/0068591 A1    Mar. 31, 2005

(51) Int. Cl.
*H04N 1/04* (2006.01)
*G03G 21/16* (2006.01)
*G03G 15/00* (2006.01)
*G03B 27/62* (2006.01)

(52) U.S. Cl.
USPC ........... 358/461; 358/474; 358/475; 358/488; 399/111; 399/379; 355/75

(58) Field of Classification Search ........... 358/497, 358/494, 474, 486, 461, 1.15, 488, 481, 453, 358/475, 452, 406; 250/235; 296/97.4; 382/293; 347/225, 239; 355/32, 75; 399/111, 379
See application file for complete search history.

(56) References Cited

U.S. PATENT DOCUMENTS

| | | | |
|---|---|---|---|
| 4,556,915 A | | 12/1985 | Shibata et al. |
| 4,721,981 A | * | 1/1988 | Rauen et al. ..................... 355/75 |
| 5,081,497 A | * | 1/1992 | Agarwal et al. ................ 399/379 |
| 5,170,037 A | * | 12/1992 | Van Amstel et al. .......... 250/235 |
| 5,818,507 A | * | 10/1998 | Genovese ...................... 358/481 |
| 6,023,716 A | * | 2/2000 | Fujita et al. ................... 358/453 |
| 6,100,994 A | | 8/2000 | Schliekelmann et al. |
| 6,147,743 A | * | 11/2000 | Fredlund et al. ................ 355/29 |
| 6,185,011 B1 | * | 2/2001 | William .......................... 358/474 |
| 6,204,937 B1 | * | 3/2001 | Takeda .......................... 358/475 |
| 6,298,172 B1 | * | 10/2001 | Arney et al. .................. 382/293 |
| 6,323,876 B1 | * | 11/2001 | Rao et al. ...................... 358/452 |
| 6,496,285 B1 | * | 12/2002 | Fujimoto et al. .............. 358/475 |
| 6,695,381 B2 | * | 2/2004 | Schlecht et al. ............. 296/97.4 |
| 6,734,948 B2 | * | 5/2004 | Futakami et al. ............... 355/32 |
| 7,046,266 B1 | * | 5/2006 | Retschke et al. ............. 347/239 |
| 7,212,316 B2 | * | 5/2007 | Huang .......................... 358/474 |
| 7,221,487 B2 | * | 5/2007 | Sesek et al. ................... 358/488 |
| 2002/0092825 A1 | * | 7/2002 | Schneider et al. ............ 347/225 |
| 2002/0109867 A1 | * | 8/2002 | Sesek et al. ................... 358/474 |
| 2004/0057082 A1 | * | 3/2004 | Liu .............................. 358/406 |
| 2004/0190934 A1 | * | 9/2004 | Okabe .......................... 399/111 |
| 2004/0263903 A1 | * | 12/2004 | Oikawa ........................ 358/1.15 |

* cited by examiner

*Primary Examiner* — Akwasi M Sarpong (57) ABSTRACT

An image reproduction apparatus includes a scanning unit, a transparent scanning bed optically coupled to the scanning unit, and an adjustable shade associated with the scanning bed, wherein the adjustable shade is configured to be selectively placed across the scanning bed to reduce a portion of the scanning bed.

22 Claims, 10 Drawing Sheets

METHOD AND AN APPARATUS FOR ADJUSTING A SCANNING TARGET AREA OF AN IMAGE REPRODUCTION DEVICE

BACKGROUND

Image scanning and photocopying are methods of reproducing a graphical or textual image. In other words, by scanning or photocopying a desired image, a nearly identical reproduction may be produced.

Document or image reproduction typically includes placing a desired document on a transparent target scanning area of a scanning device where it can be optically scanned by the internal scanning components of the scanning device. Once scanned, the desired document is then reproduced on an image receiving medium through the transfer of the scanned image onto the image receiving medium.

However, because the target scanning area of scanning, photocopying, or other document reproduction devices is traditionally predetermined by the manufacturer, a user of a scanning device often acquires certain shading or umbrae on the reproduction of the scanned document or object. For example, if a user scans a bound set of documents (e.g. a bound volume) using a traditional scanning device and method, the spine of the scanned bound set of documents will often show on the reproduced image as a shadow or umbra. Similarly, the extraneous pages of the volume being scanned will often create certain patterns on the edges of the reproduced image. Moreover, blemishes, extraneous writings, typing, marks in general, or any other certain imperfection in the document or object being scanned may be reproduced as patterns or images on the reproduced image.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements. While the system and method is susceptible to various modifications and alternative forms, specific embodiments thereof have been shown by way of example in the drawings and are herein described in detail. It should be understood, however, that the description herein of specific embodiments is not intended to limit the system and method to the specific forms disclosed, but on the contrary, the intention is to cover all modifications, equivalents, and alternatives falling within the spirit and scope of the system and method as defined by the appended claims.

DETAILED DESCRIPTION

The present specification describes example embodiments of a system and a method for selectively scanning, copying, or printing desired images. More specifically, some embodiments of the present system and method involve the use of a number of adjustable shades in an image reproduction device to allow the user of such a device to crop or avoid certain defects and/or flaws present in an original document. Certain defects or flaws that may be avoided by the present method include, but are in no way limited to, typing marks, writings, stampings, shading, umbrae, etc.

As used in the present specification and in the appended claims, the term "image reproduction device" is meant to be understood as any device typically used to create an electronic or a hard copy of a desired image. Some examples of image reproduction devices include, but are in no way limited to, image scanners, printers, photocopiers, facsimile machines, and the like.

Figure 1A:
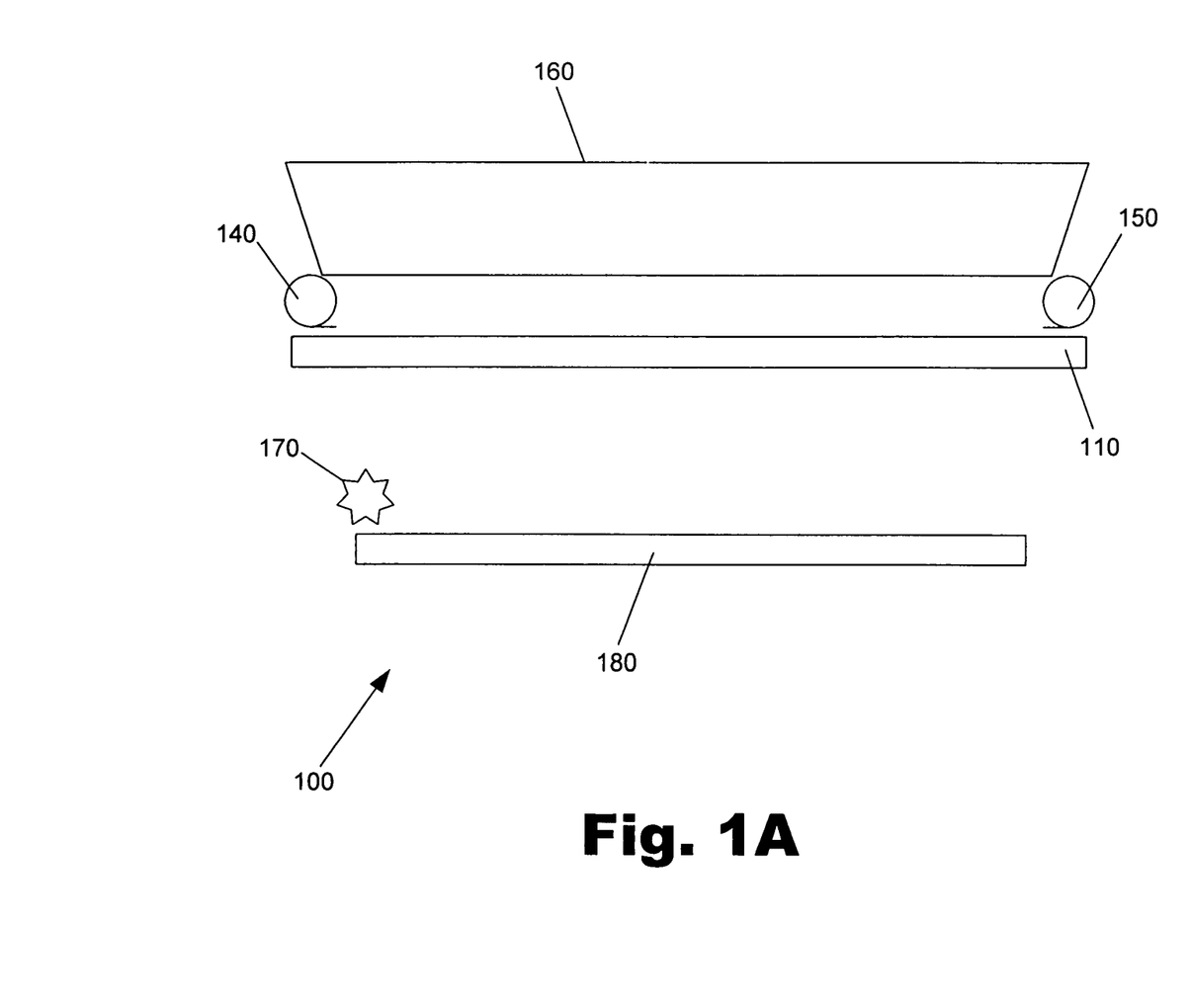
FIG. 1A is a side elevation view of a scanning device that may be incorporated in an image reproduction device according to one exemplary embodiment.

Turning now to the figures, FIG. 1A illustrates a scanning device (100) that may be used according to one exemplary embodiment of the present system and method as a portion of an image reproduction system. The scanning device (100) illustrated in FIG. 1A includes a scanning bed (110), a number of shade reels (140, 150), a cover (160), a light source (170), and a photoconducting platen or drum (180).

When a reproduction of a desired image is to be made, the original document or other object containing the desired image may be positioned on top of the scanning bed (110) and the cover (160) may be closed in preparation for scanning. The scanning bed (110) illustrated in FIG. 1A may be made of any number of transparent materials including, but in no way limited to, glass or plastic. Once the original document or object has been placed on the scanning bed (110), it is visibly accessible by the light source (170) and the photoconducting drum (180) through the transparent scanning bed (110).

Once an image reproduction process is requested, the light source (170), in concert with optional mirrors (not shown) and other optical devices (not shown), illuminates the original document or other object containing the desired image disposed on the scanning bed (110) with an intense beam of light. The illuminated pattern of the original document or other object containing the desired image located on the scanning bed (110) is then projected onto the positively charged photoconducting drum (180) or other image sensor(s) below.

Light reflected from blank areas of the original document containing the desired image hits specific portions of the photoconducting drum (180) and causes a charge covering those specific portions of the surface of the photoconducting drum (180) to become neutralized. Additionally, the underside of the cover (160) reflects light emitted from the light source (170) to the photoconducting drum (180) neutralizing additional charged portions. In contrast, the non-reflective areas of the original document do not reflect light from the light source (170) and do not neutralize charge on the surface of the photoconducting drum (180). This process leaves positive charges on the photoconducting drum (180) corresponding to the dark areas on the original document or other object containing the desired image. These positive charges attract negatively charged toner (not shown), which may then be transferred and fused to a positively charged image receiving medium (not shown) producing a reproduction of the original document or other object according to one exemplary embodiment.

Alternatively, the scanning device may scan the original document as explained above and a photo sensor (not shown) may receive the reflected light converting it into a digital image. The scanned image could then be translated onto a print medium using any number of printing techniques including, but in no way limited to, inkjet technology or charge induced toner transfer.

While the above-mentioned methods accurately leaves positive charges on the photoconducting drum (180) that correspond to the dark areas on the original document or other object containing the desired image, less desirable images or characteristics of the original document may also cause positive charges to remain on the photoconducting drum (180). When negatively charged toner is attracted to these positive charges and then transferred to a positively charged image receiving medium, certain patterns or images may result on the image receiving medium. Traditionally, these patterns or images were difficult to avoid because the scanning target area of a scanning device was fixed by the dimensions of the scanning bed (110). However, one or more shade reels (140, 150) are included in some exemplary embodiments of the present system and method in order to adjust the dimensions of the scanning target area.

Figure 1B:
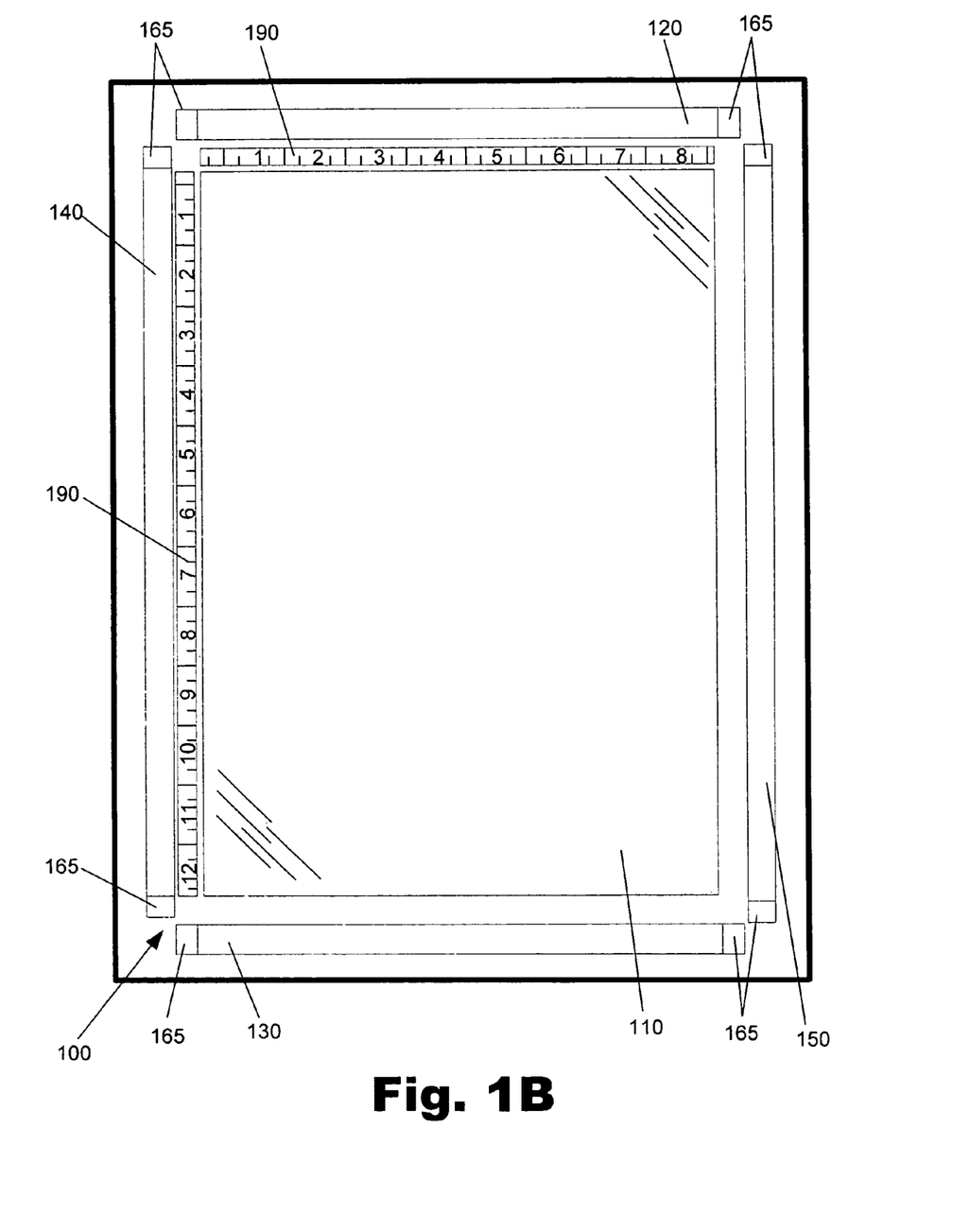
FIG. 1B is a top view illustrating the present apparatus incorporated into a scanning device according to one exemplary embodiment.
Figure 2:
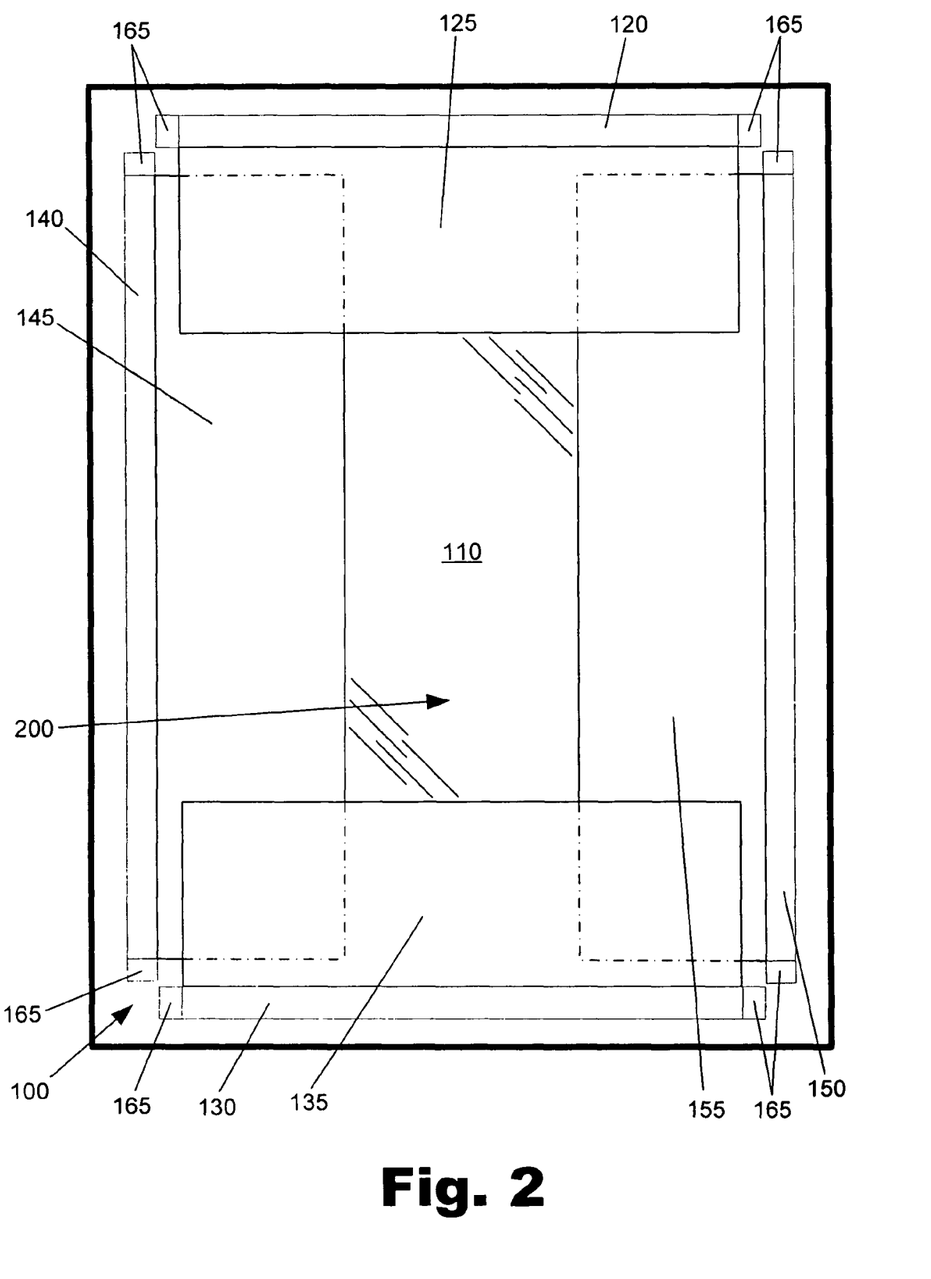
FIG. 2 is a top view depicting the utilization of shades in a scanning device according to one exemplary embodiment.

FIG. 1B illustrates an exemplary embodiment of a set of shade reels (120, 130, 140, 150) disposed near the scanning bed (110). As shown in FIG. 1B, the shade reels (120, 130, 140, 150), each containing a shade (125, 135, 145, 155; FIG. 2), maybe disposed near the edges of the scanning bed (110). While the present system and method may be practiced using any number of shade reels (120, 130, 140, 150) positioned in any number of locations with respect to the scanning bed (110), for ease of explanation only, the present system and method will be described in the context of a scanning device incorporating four shade reels (120, 130, 140, 150) disposed on the four edges of the scanning bed (110) as shown in FIG. 1B. The shade reels (120, 130, 140, 150) may be coupled to the scanning device (100) such that they may allow a user to draw the shades (125, 135, 145, 155; FIG. 2) across the top of the scanning bed (110) thereby limiting the target area of the scanning device (100).

FIG. 1B also illustrates a number of measurement grids (190) disposed adjacent to the scanning bed. The measurement grids may aid a user in accurately determining the amount the shades (125, 135, 145, 155) have been or need to be drawn. This allows a user to precisely cover certain portions of the scanning bed (110). The measurement grids (190) may display any number of units including, but in no way limited to, inches or centimeters.

An example apparatus by which a user of the present system and method may draw the shades (125, 135, 145, 155) is depicted in FIG. 2. The shades (125, 135, 145, 155) corresponding with the shade reels (120, 130, 140, 150) may be made of plastic or any other opaque material. Additionally, the undersides of the shades (125, 135, 145, 155) may be light in color. According to one exemplary embodiment, the undersides of the shades (125, 135, 145, 155) are white. However, the undersides of the shades (125, 135, 145, 155) may be any color sufficiently reflective to reflect photons of light being emitted by the light source (170; FIG. 1A) during a scanning operation including, but in no way limited to white, yellow, or green. The light coloring of the shade undersides reflects photons of light being emitted by the light source (170; FIG. 1A) during a scanning operation. By reflecting the emitted light, the shade undersides neutralize charge on the surface of the photoconducting drum (180; FIG. 1A) in the same manner as the cover (170; FIG. 1A) explained above. As a result, the light reflective coloring of the shade undersides prevents the accumulation of toner caused by obscure non-reflective areas.

FIG. 2 demonstrates an exemplary method of drawing the shades (125, 135, 145, 155) to limit the target area of the scanning bed (110). As shown in FIG. 2, each shade (125, 135, 145, 155) may be laterally drawn to conceal an area of the scanning bed (110). The portion of the scanning bed (110) that will remain exposed after one or more shades (125, 135, 145, 155) have been drawn will define a target area (200). The target area (200) may then be adjusted to represent the portion of the original document that the user desires to be exhibited and transferred to the scanned image.

According to one exemplary embodiment, the shades (125, 135, 145, 155) may be coupled to the shade reels (120, 130, 140, 150) such that the shades (125, 135, 145, 155) are concentrically wrapped around the shade reels in a coil configuration. This coiling will allow the shades (125, 135, 145, 155) to be drawn from the shade reels (120, 130, 140, 150) in such a way as to allow the shades (125, 135, 145, 155) to be retracted back into the shade reels (120, 130, 140, 150) upon completion of their use. The drawing and retracting of the shades (125, 135, 145, 155) to and from the shade reels (120, 130, 140, 150) may be accomplished via a spring loaded reel and lock system (165) or other suitable mechanism that will allow the shades (125, 135, 145, 155) to be drawn and retracted to a desired location while allowing the shades (125, 135, 145, 155) to remain in their desired positions after they are drawn. Alternatively, the shades (125, 135, 145, 155) may be a planar opaque material housed in the scanning device that may be slidably translated into position by the user to limit the target area.

As shown in FIG. 2, all of the shades (125, 135, 145, 155) have been drawn a short distance to reduce the area of the target area (200). This orientation may be varied in a number of different ways to accommodate the object being scanned. A number of exemplary embodiments will now be explained with reference to FIG. 3 through FIG. 6B.

Figure 3:
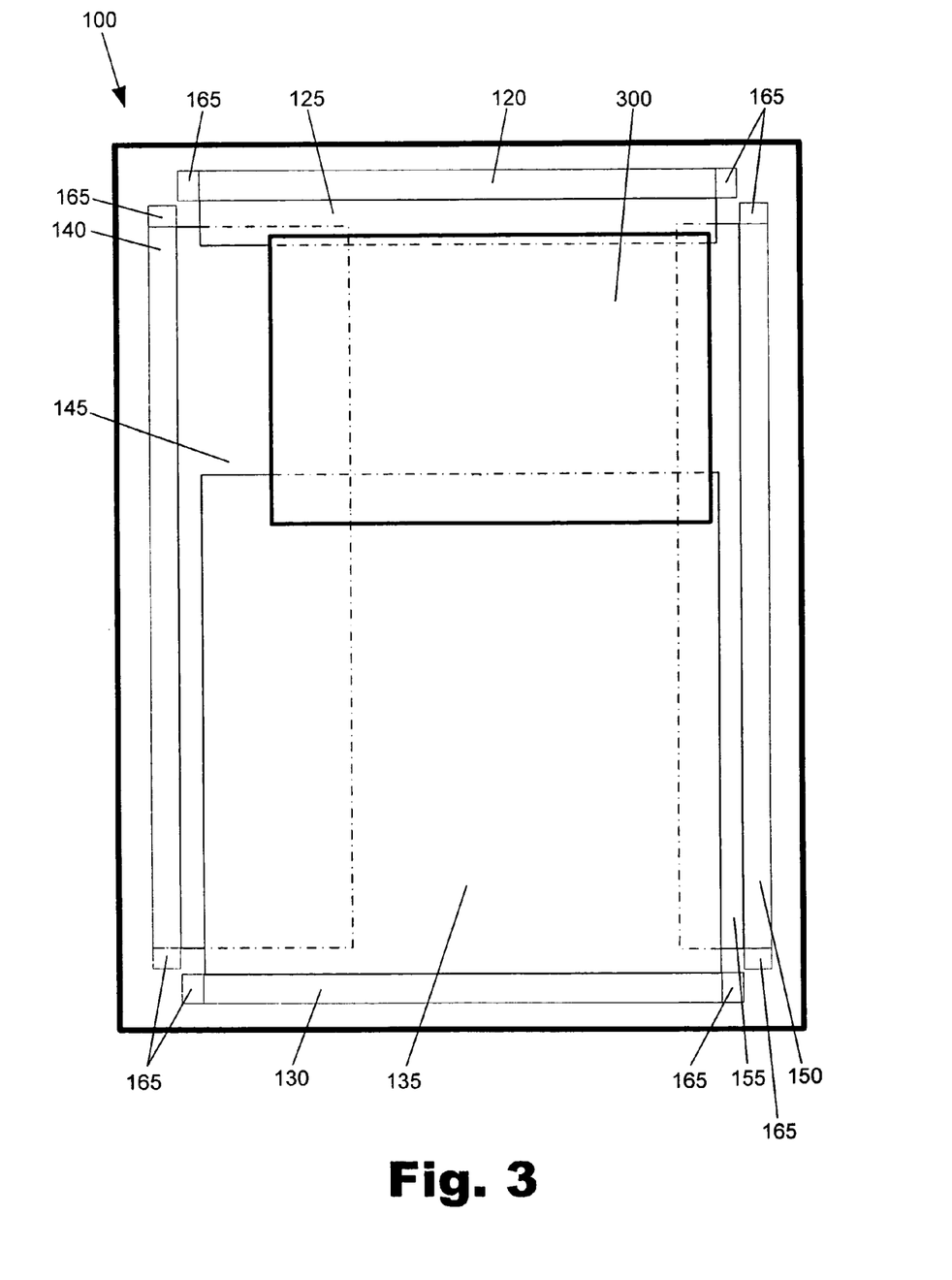
FIG. 3 is a top view depicting a scanning device cropping a document according to one exemplary embodiment.

FIG. 3 depicts a method by which a user may crop a standard sized 8.5×11 inch document (300). The cropping of the document (300) may be accomplished by drawing the appropriate shades (125, 135, 145, 155) across the scanning bed (110) in order to reduce the size of the target area (200; FIG. 2). By way of example, as shown in FIG. 3, if the top portion of the document contained certain content, the shade (145) corresponding to that portion of the document (300) may be drawn. The distance the shade (145) is drawn corresponds to the distance from the shade reel (140) to the furthest point of the certain content. The other shades (125, 135, 155) may similarly be drawn to avoid reproduction of additional content. Once the shades (125, 135, 145, 155) have all been drawn the appropriate distance, the document (300) may be placed onto the scanning bed (110; FIG. 2) above the drawn shades (125, 135, 145, 155). The document (300) may be positioned such that only desirable content is exposed to the modified target area (200; FIG. 2). When the scanning operation is subsequently executed, the shade (145) will prevent the identified content from affecting the image receiving medium.

Figure 4:
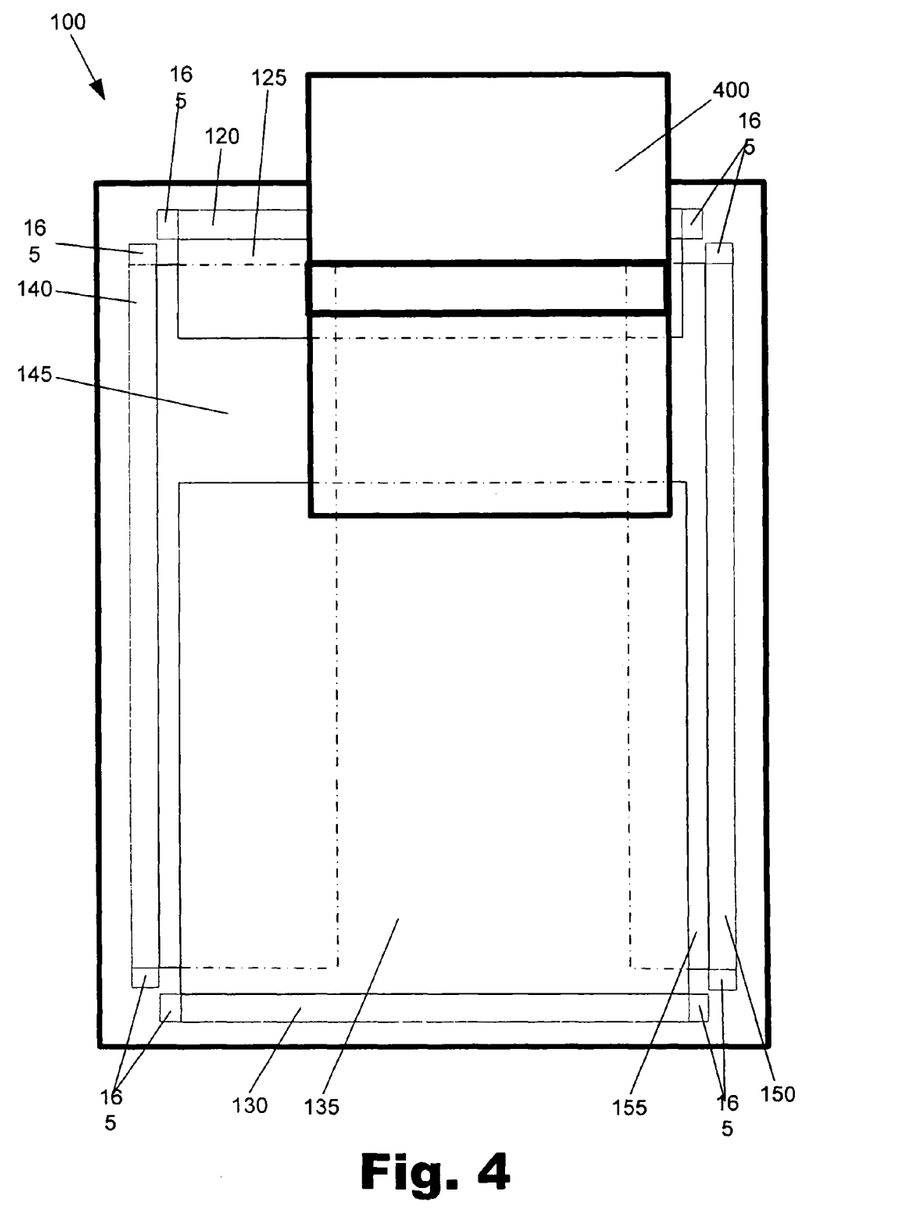
FIG. 4 is a top view illustrating a bound volume being scanned and cropped according to one exemplary embodiment.

Similarly, FIG. 4 illustrates a bound volume (400) being scanned by a scanning device implementing an exemplary method for adjusting the target area (200; FIG. 2) in a scanning device (100). Often, the user of a scanning device (100) reproduces images originally contained in bound volumes (400). As a consequence of the non-planar nature of an opened bound volume, the resulting image of such a scan process often produces umbrae or shadowed areas corresponding to the location of the spine of the bound volume (400). Moreover, the image of superfluous pages at the edge of the bound volume (400) is often reproduced on the image receiving medium. According to one exemplary embodiment of the present system and method, the appropriate shades (125, 135, 145, 155) may be drawn to occupy space between the umbrae or shadow causing portions of the bound volume and the scanning bed (110; FIG. 2). This occupation enables the shades (125, 135, 145, 155) to block portions of the original bound volume (400) from the target area (200; FIG. 2) of the scanning device (100).

As shown in FIG. 4, the top (125) and the bottom (135) shades are drawn a distance such that they extend past the spine and superfluous pages of the bound volume (400), respectively. Additionally, the side shades (145, 155) are drawn thereby defining the area that will be optically coupled to the scanning device (100). Once the shades (125, 135, 145, 155) have been drawn, the bound volume (400) may be placed on top of the shades such that only the desired content is exposed to the target area (200; FIG. 2) of the scanning device (100). When the scanning process is executed, the shades (125, 135, 145, 155) reduce or eliminate any umbrae and/or shading from the image receiving medium.

Figure 5A:
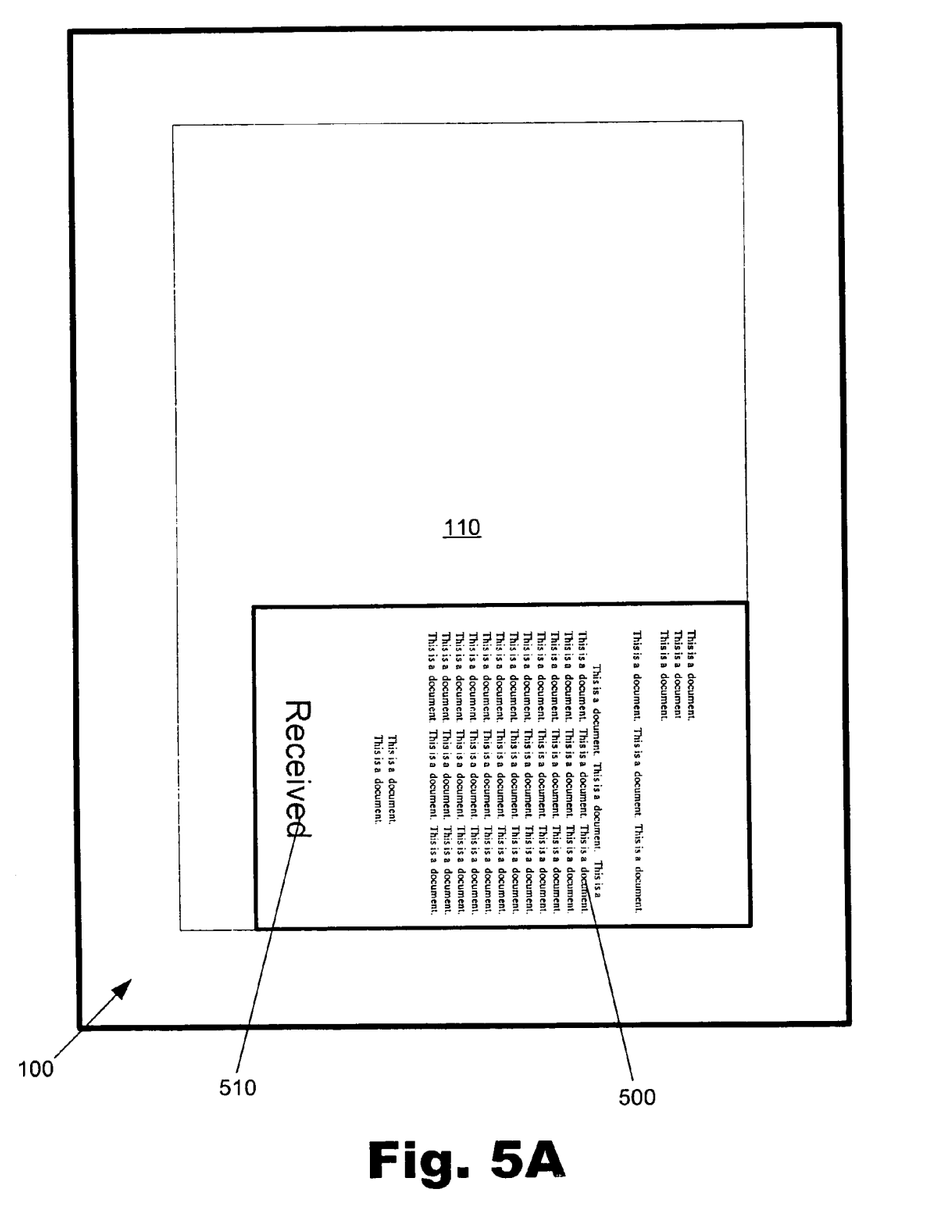
FIG. 5A is a bottom view from the vantage point of a photoconducting drum illustrating a document having a certain mark at the bottom according to one exemplary embodiment.
Figure 5B:
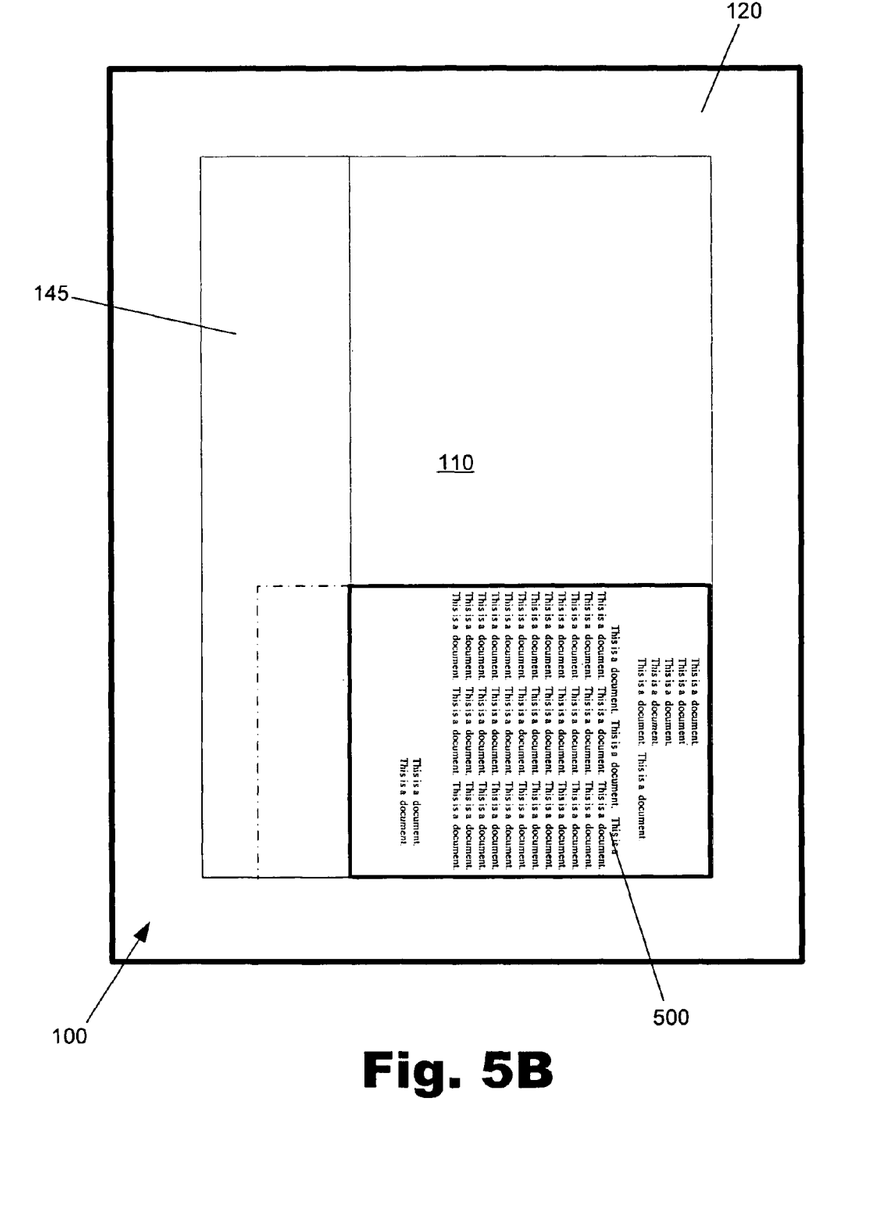
FIG. 5B is a bottom view from the vantage point of a photoconducting drum illustrating the document of FIG. 5A being cropped in such a manner as to eliminate the mark at the bottom of the document according to one exemplary embodiment.

FIGS. 5A and 5B illustrate bottom views of the scanning bed (110) of a scanning device (100) having a document (500) disposed thereon from the vantage point of a photoconductive drum (180; FIG. 1A). As shown in FIG. 5A, the document (500) includes a certain mark (510) located at the bottom of the scanned document (500). Without incorporating the present system and method, a scanning operation will reproduce the mark (510) onto an image receiving medium. However, by incorporating the shades (125, 135, 145, 155; FIG. 2) of the present system, the scanning area occupied by the document (500) can be cropped in such a way as to prevent the mark (510) from being transferred to the image receiving medium.

As shown in FIG. 5B, a shade (145) closest to the mark (145) may be drawn from its corresponding shade reel (140; FIG. 2) in a direction orthogonal to the orientation of the mark (510; FIG. 5A). The shade (145) may be drawn to a length sufficient to at least partially cover the area of the bed (110) corresponding to the mark (510). The original document may then be placed on the scanning bed (110) and on the shade (145). According to this exemplary embodiment, the modified target area (200; FIG. 2) formed by the placement of the shade (145) will prevent the mark (510) from being reproduced on the image receiving medium during a scanning operation.

Figure 6A:
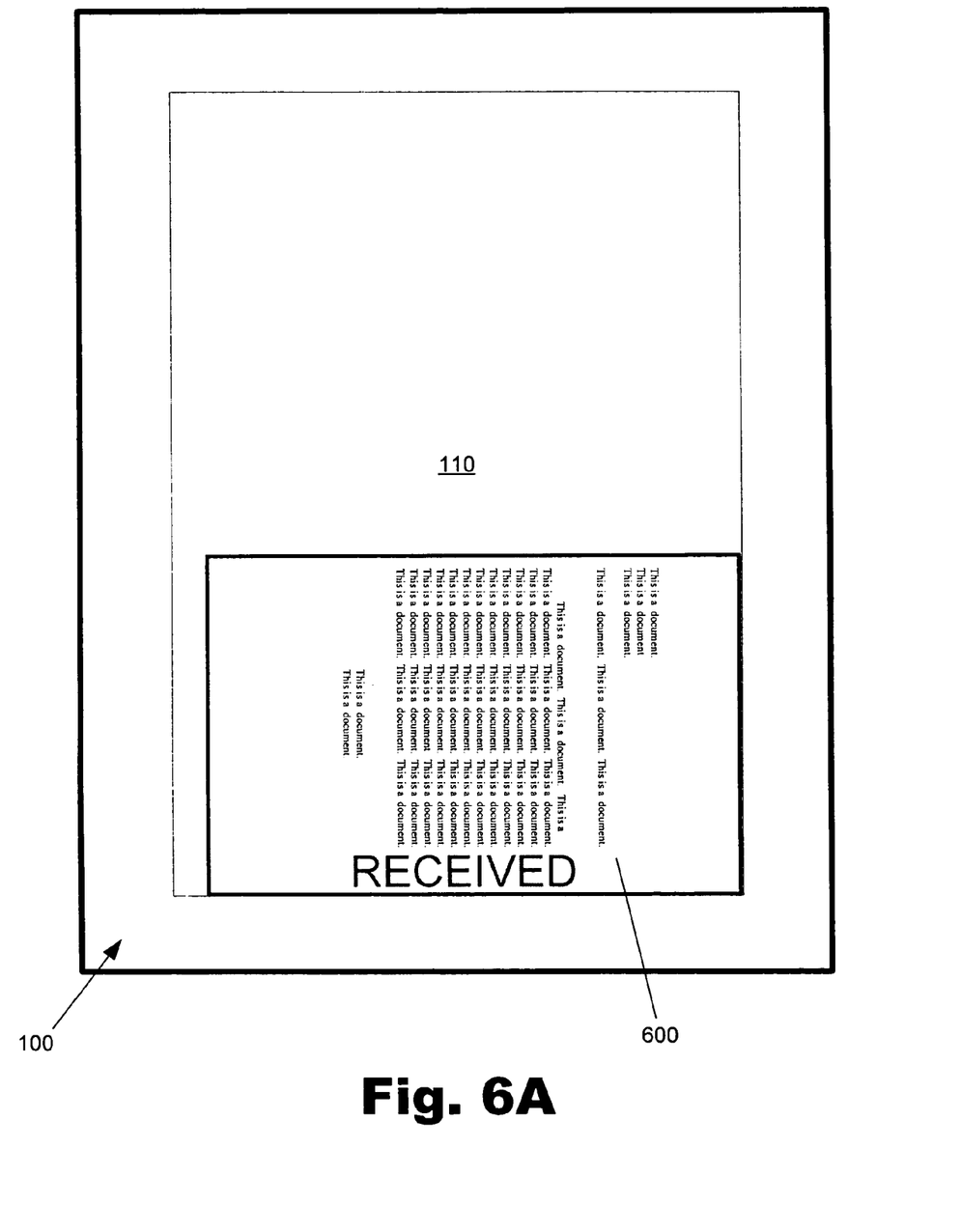
FIG. 6A is a bottom view from the vantage point of a photoconducting drum illustrating a document which has a certain mark at the side of the document according to one exemplary embodiment.
Figure 6B:
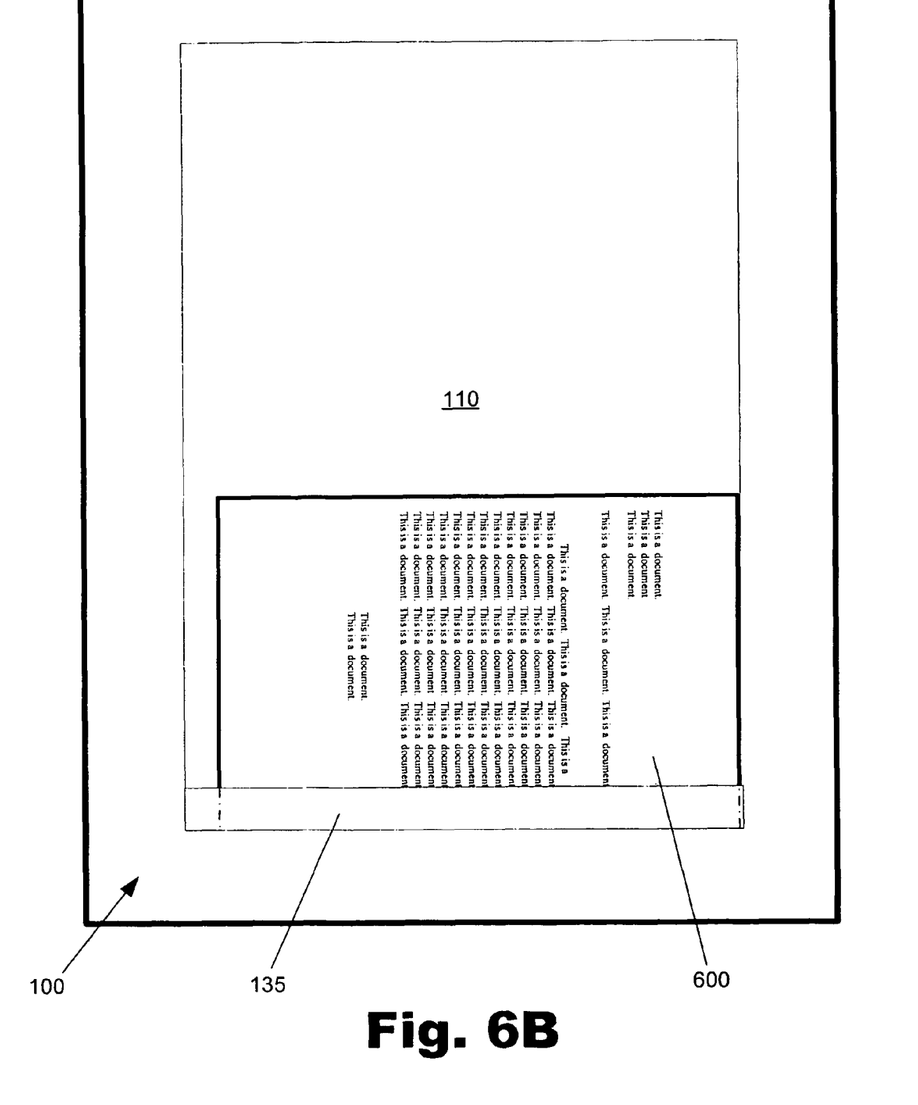
FIG. 6B is a bottom view from the vantage point of a photoconducting drum illustrating the document of FIG. 6A being cropped according to one exemplary embodiment.

Similar to FIG. 5A, FIGS. 6A and 6B illustrate a bottom view of a document (600) disposed on the scanning bed of a scanning device (100) as seen from the vantage point of a photoconductive drum (180; FIG. 1A). The document (600) illustrated in FIG. 6A also includes a certain mark (610) disposed along a side edge. FIG. 6B is a bottom view of the scanning device (100) as seen from the vantage point of a photoconductive drum (180; FIG. 1A) implementing a method for preventing the transfer of the mark (610; FIG. 6A) to an image receiving medium. According to the orientation illustrated in FIG. 6B, the bottom shade (135) or the shade nearest the mark (610; FIG. 6A) is drawn from its shade reel (130) to an appropriate length sufficient to at least partially cover the mark (610; FIG. 6A). The original document (600) may then be placed on the scanning device (100) scanning bed (110) and the drawn shade (135). Once the original document (600) is placed on the scanning bed (110) and shade (135) as shown in FIG. 6B, the scanning operation may be performed. The resulting image produced on the image receiving medium is subsequently void of the mark (610; FIG. 6A).

Figure 7:
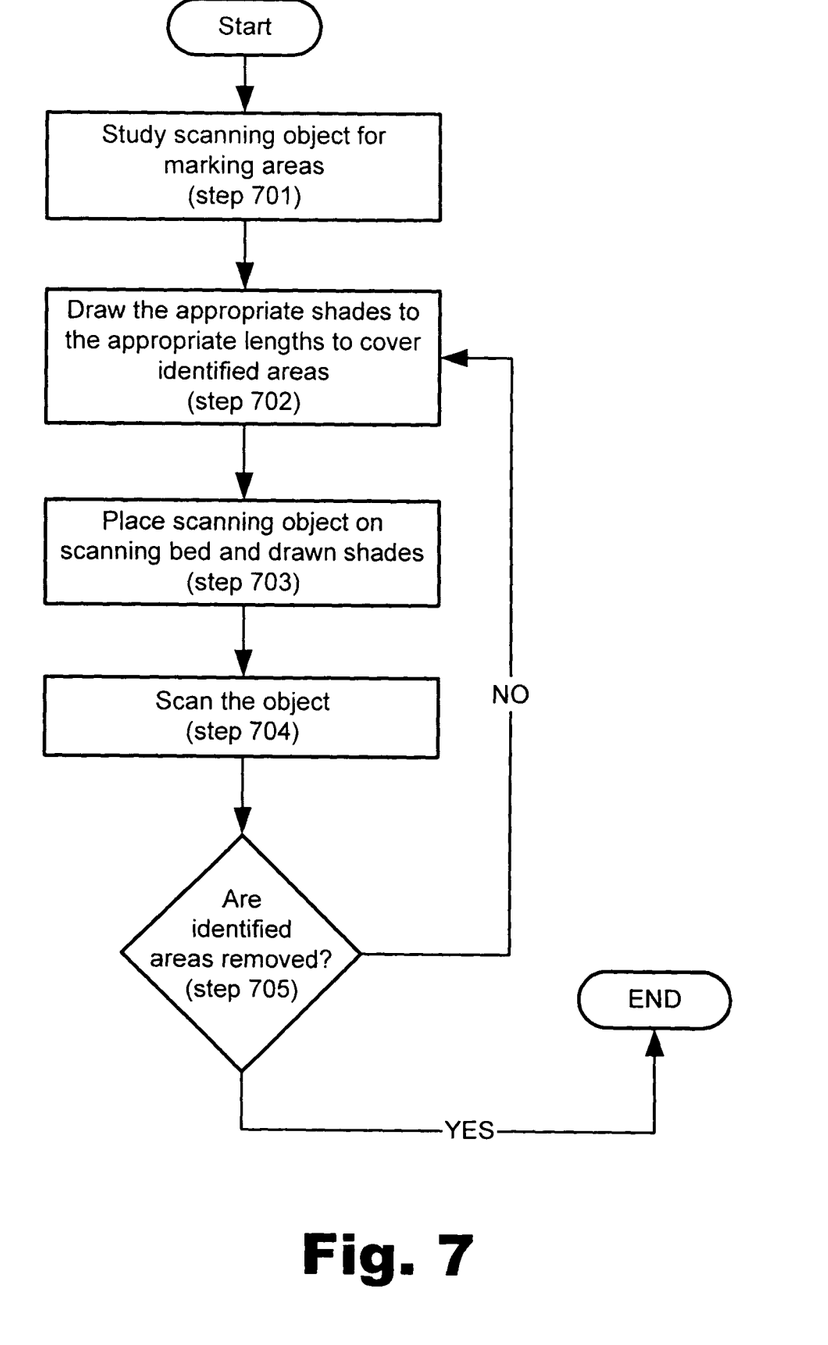
FIG. 7 is a flow chart outlining a method of operating the present system according to one exemplary embodiment.

FIG. 7 illustrates an exemplary method by which a user of the present system and method may utilize the shades (125, 135, 145, 155). Initially, the original document or object that is to be scanned is examined for marking areas (step 701). This visual inspection may be performed by a user to identify and locate certain areas on the original document or object that would reproduce marks on the image receiving medium. Typical areas may include, but are in no way limited to, areas where certain marks, umbra, text, labels, warnings, etc. exist.

Once potential locations of certain areas on the original document have been identified, the appropriate shades (125, 135, 145, 155; FIG. 3) are drawn in order to cover the identified areas (step 702). The quantity and manner of shades to be drawn for a specific original document will vary and may be performed according to the methods illustrated above with regards to FIG. 2 through FIG. 6B. By drawing the appropriate shades over selective portions of the scanning bed (102; FIG. 3), the effective target area (200; FIG. 2) is reduced.

When the effective target area (200; FIG. 2) has been set by the drawing of the appropriate shades (step 702), the object is placed on the scanning bed and at least partially on one or more of the shades (step 703) such that the desired area of the original document is positioned in the effective target area (200; FIG. 2) and unwanted marks or areas of the original document are outside of the effective target area (200; FIG. 2) due to the placement of the shades (125, 135, 145, 155; FIG. 3). By placing the original document being scanned on the effective target area (200; FIG. 2), as illustrated above, the original document is prepared to be scanned.

Once prepared, the original document or object may be scanned by the scanning device (step 704). The original document or object may be scanned using the present techniques and methods of a suitable scanning device (100; FIG. 1A). As the original document or object is scanned, the shades (125, 135, 145, 155; FIG. 3), if placed correctly, prevent certain marks on the object from being scanned and reproduced on the image receiving medium.

After the scanning operation has been performed, the user may optically inspect the scanned image to confirm that the identified areas of the original document or object were not scanned by the scanning device (100; FIG. 1A) and that the avoidance of the identified areas is reflected in the scanned image. If identified areas were scanned (NO, step 705), the user may optionally re-draw the shades (125, 135, 145, 155; FIG. 3) to appropriate lengths (step 702) and begin the scanning process again. This cycle may be repeated any number of times until a scanning operation is performed that eliminates all of the identified areas of the original document or object (YES, step 702). Once the object is scanned correctly (YES, step 702), the scanning process is complete and another object may be scanned.

The preceding description has been presented only to illustrate and describe embodiments of system and method. It is not intended to be exhaustive or to limit the system and method to any precise form disclosed. Many modifications and variations are possible in light of the above teaching. It is intended that the scope of the system and method be defined by the following claims.

What is claimed is:

1. An image reproduction apparatus comprising:
   a transparent scanning bed;
   a scanning device optically coupled to said scanning bed, said scanning device comprising a photoconductive platen configured to receive light reflected off of an object on said scanning bed; and
   an adjustable shade associated with said scanning bed;
   wherein said adjustable shade is configured to be selectively extended from a position adjacent said scanning bed to cover a portion of said scanning bed including from an edge of said scanning bed to a leading edge of said adjustable shade, an underside of said shade presented to said scanning device through said bed being colored such that said scanning device outputs no image when scanning said underside of said shade thereby effectively reducing a size of said scanning bed.

2. The image reproduction apparatus of claim 1, wherein said scanning device comprises
   a light source configured to illuminate said scanning bed such that said platen obtains a latent image of said object on said scanning bed.

3. The image reproduction apparatus of claim 1, wherein said scanning bed is configured to receive a document.

4. The image reproduction apparatus of claim 3, wherein said scanning bed comprises glass.

5. The image reproduction apparatus of claim 3, wherein said scanning bed comprises plastic.

6. The image reproduction apparatus of claim 1, wherein said adjustable shade comprises an opaque material.

7. The image reproduction apparatus of claim 6, wherein said adjustable shade further comprises a shade reel including a spring and a lock mechanism.

8. The image reproduction apparatus of claim 7, wherein said opaque material is coiled around said shade reel.

9. The image reproduction apparatus of claim 1, further comprising an adjustable shade disposed on each side of said scanning bed.

10. The image reproduction device of claim 9, wherein said adjustable shades are coupled to said image reproduction device and said adjustable shades are configured to be drawn to a desired length, maintain said desired length for a desired length of time, and to be retracted by a spring and lock mechanism.

11. A method of adjusting a target area of an image reproduction apparatus comprising:
    selectively covering an edge of a scanning bed by drawing a shade over said edge of said scanning bed;
    placing said object on said drawn shade; and
    scanning said object;
    wherein an underside of said shade that is presented to said scanning bed is colored such that said scanning outputs no image of said underside of said shade thereby effectively reducing a size of said scanning bed.

12. The method of claim 11, wherein said drawing a shade comprises:
    measuring a distance from said shade to a furthest point of a certain condition; and
    extending said shade equal to said distance.

13. The method of claim 12, wherein said shade comprises an opaque material;
    wherein said opaque material is configured to prevent the scanning of an object.

14. An optical scanner with an adjustable shade comprising:
    a shade reel disposed at an edge of a scanning bed of said optical scanner; and
    a shade coupled to said shade reel;
    wherein an underside of said shade that is presented to said scanning bed is colored such that said optical scanner does not output any image markings when scanning said underside of said shade thereby effectively reducing a scan target area of said optical scanner.

15. The adjustable shade of claim 14, wherein said shade comprises opaque material that is concentrically wrapped around said shade reel.

16. The adjustable shade of claim 14, wherein said shade is wound on said reel which further comprises a spring and lock mechanism.

17. The adjustable shade of claim 16, wherein said spring and lock mechanism is configured to permit said shade to be drawn to a desired length, maintain said desired length for a desired length of time, and to be retracted to said shade reel.

18. The adjustable shade of claim 14, wherein an underside of said shade is configured to reflect an emitted light.

19. The adjustable shade of claim 18, wherein said underside of said shade is white.

20. A scanning device for eliminating unwanted areas of a scanned image, said scanning device comprising:
    means for scanning; and
    means for selectively covering edges of a scanning bed such that said means for scanning outputs no image markings when scanning said covered portions of said scanning bed;
    wherein said means for covering edges of said scanning bed are configured to selectively and statically reduce an effective scanning area of said means for scanning;
    wherein said means for selectively covering comprises:
    a shade reel, and
    an opaque material coupled to said shade reel; and
    wherein said shade reel comprises a spring and lock mechanism configured to allow selective retraction and restoration of said shade reel.

21. The method of claim 11, further comprising using said shade to prevent said scanning from imaging a spine of a bound volume.

22. The method of claim 11, further comprising using said shade to prevent said scanning from imaging a notation on a document.

* * * * *